US011828323B2

(12) United States Patent
Fullick (10) Patent No.: US 11,828,323 B2
(45) Date of Patent: Nov. 28, 2023

(54) MECHANICAL CONNECTOR, TWO PART CONNECTOR AND MUNTIN CLIP FOR PROVIDING A FRICTIONAL ENGAGEMENT

(71) Applicant: Kenneth Fullick, McHenry, IL (US)

(72) Inventor: Kenneth Fullick, McHenry, IL (US)

(73) Assignees: Douglas J. Fullick, Orland Park, IL (US); Daniel M. Fullick, Honolulu, HI (US)

( * ) Notice: Subject to any disclaimer, the term of this patent is extended or adjusted under 35 U.S.C. 154(b) by 0 days.

(21) Appl. No.: 17/392,187

(22) Filed: Aug. 2, 2021

(65) Prior Publication Data

US 2021/0364024 A1 Nov. 25, 2021

Related U.S. Application Data

(63) Continuation of application No. 15/147,675, filed on May 5, 2016, now abandoned.

(51) Int. Cl.
*F16B 7/04* (2006.01)
*E06B 3/68* (2006.01)
(Continued)

(52) U.S. Cl.
CPC .......... *F16B 7/0473* (2013.01); *E06B 3/6675* (2013.01); *E06B 3/685* (2013.01); *F16B 2/04* (2013.01); *F16B 21/086* (2013.01)

(58) Field of Classification Search
CPC ........ F16B 7/0473; F16B 2/04; F16B 21/086; E06B 3/6675; E06B 3/685
See application file for complete search history.

(56) References Cited

U.S. PATENT DOCUMENTS 8,001,742 B2 * 8/2011 Briese .................. E06B 3/6675
403/201
2001/0034990 A1 * 11/2001 Reichert ................. E06B 3/667
52/456

(Continued)

*Primary Examiner* — Brian D Mattei
*Assistant Examiner* — Omar F Hijaz
(74) *Attorney, Agent, or Firm* — Loppnow & Chapa (57) ABSTRACT

The present application provides a mechanical connector adapted for coupling to a mating element, as part of muntin clip or a two part connector. The mechanical connector includes a body having at least one surface adapted for engaging a reciprocal surface of the mating element, wherein the at least one surface of the body of the mechanical connector slides across and frictionally engages the reciprocal surface of the mating element across a predefined distance during the coupling and decoupling of the mechanical connector relative to the mating element. The mechanical connector further includes one or more protruding elements, coupled to the at least one surface of the body of the mechanical connector, which extend in a direction toward the reciprocal surface of the mating element during engagement of the at least one surface of the mechanical connector with the reciprocal surface of the mating element, where the protruding elements is attached to the at least one surface at a first end of the protruding element and being free at the second end of the protruding element, and where the protruding element can separately flex along the length of the protruding element toward each of multiple directions including opposite directions. When the mechanical connector engages and slides relative to the mating element, the one or more protrusions are caused to flex in a direction that is substantially opposite a direction of the movement of the mechanical connector relative to the mating element along at least a portion of the predefined distance.

7 Claims, 7 Drawing Sheets

(51) Int. Cl.
  *E06B 3/667*  (2006.01)
  *F16B 21/08*  (2006.01)
  *F16B 2/04*   (2006.01)

(56) References Cited

U.S. PATENT DOCUMENTS

| | | | |
|---|---|---|---|
| 2005/0102957 A1* | 5/2005 | Scharff | E06B 3/6675 52/698 |
| 2006/0162281 A1* | 7/2006 | Pettit | E06B 3/667 52/786.13 |
| 2007/0193148 A1* | 8/2007 | Simko | E06B 1/705 52/456 |
| 2009/0158677 A1* | 6/2009 | Liang | E06B 3/6675 52/204.62 |

* cited by examiner

MECHANICAL CONNECTOR, TWO PART CONNECTOR AND MUNTIN CLIP FOR PROVIDING A FRICTIONAL ENGAGEMENT

FIELD OF THE APPLICATION

The present disclosure relates generally to friction fit connectors, and more particularly, to muntin clip connectors for use in a multi-pane window sash.

BACKGROUND

Historically, a muntin includes a strip of material such as wood or metal, which is used to hold multiple smaller panes of glass together to form a larger window sash or casement of a window. As window manufacturers transitioned to the use of larger panes of glass as well as multi-pane windows, muntins have become less necessary as a structural feature. However, muntin like structures continue to be used as a desired aesthetic architectural design detail, as it gives the windows additional visual interest, and an appearance that is consistent with when muntins were used to integrate the use of smaller panes of glass. In other words, more recently, the muntins tend to be more for aesthetic purposes and include bar configurations that are often positioned over a single pane of glass or are sandwiched between multiple panes of glass whose size corresponds more closely to the overall dimension of the window sash or casement.

In at least some of the instances, where the muntin is an aesthetic architectural design detail, the muntin includes a bar formed from metal that has been folded over to form a tube having openings at opposite ends, where the length of the tube corresponds to the length or width of the particular window sash or casement that the muntin is intended to traverse. The muntin will often include a seam in one of the sides of the tube, where the ends of the metal have been folded over to meet and form the tube. The muntin is attached to the structure of the window via one or more muntin clips, which are respectively received in a corresponding one of the muntin's open ends. The muntin clips are often sized at one end to have a friction fit relative to the portion of muntin within which a portion of the muntin clip is intended to be received. The muntin clips will typically further facilitate a coupling of the muntin to the structure of the window at a point, which produces the desired visual placement and effect.

In order to produce a friction fit, the clip will often have a spring-like bias, which when inserted into an open end of the tubing, will exert a pressure from the inside out against the sidewall of the muntin bar for helping to maintain a connection. This can sometimes create a bias that can cause the sidewall of the muntin to spread apart proximate the seam in the side of the tube resulting in an undesirable visual effect, which can be possibly perceived by a user depending upon how the clip interacts with the muntin bar. Still further it is desirable for the muntin clip to have a secure fit that will firmly hold in place the muntin relative to the rest of the window structure, while resisting any unwanted decoupling, without causing any unwanted spreading of the side seam.

The present inventors have recognized that, by incorporating one or more protrusion elements, which are each adapted to alternatively flex along its length in at least opposite directions, where a connector, like a muntin clip, is likely to interact with an engagement surface of a mating element, like a muntin bar, the connector can provide a smoother more secure fit, which can increasingly resist changes in direction of the relative movement between the connector and the mating element.

SUMMARY

The present application provides a muntin clip adapted for coupling a muntin bar to a window sash. The muntin bar is a tubular member with one or more open ends and a sidewall extending around the open end, the sidewall of the tubular member having a front and a back and two oppositely facing and spaced apart sides coupled between the front and the back. The muntin clip includes a base adapted for attaching to the window sash. The muntin clip further includes a body, which extends from the base, and which is adapted to extend into one of the open ends of the muntin bar for coupling thereto. The muntin clip still further includes one or more protruding elements coupled to the body, which extend in a direction that includes a component that is perpendicular to the direction of insertion of the body into the tubular member, and which are adapted for separately flexing in at least opposite directions. When the muntin clip is inserted into the tubular member, the protruding elements of the muntin clip engages the sidewall of the tubular member and is caused to flex in a direction that is substantially opposite a direction of the movement of the muntin clip relative to the tubular member.

In at least one embodiment, at least some of the one or more protruding elements are coupled to the body of the muntin clip via a branch. In some of these instances, when the muntin clip is inserted into the tubular member, the branch extends toward a respective one of the sides of the sidewall, and the branch is biased in an angled fashion toward one of the front or the back of the sidewall away from a center of the respective side.

The present application further provides a mechanical connector adapted for coupling to a mating element. The mechanical connector includes a body having at least one surface adapted for engaging a reciprocal surface of the mating element, wherein the at least one surface of the body of the mechanical connector slides across and frictionally engages the reciprocal surface of the mating element across a predefined distance during the coupling and decoupling of the mechanical connector relative to the mating element. The mechanical connector further includes one or more protruding elements, coupled to the at least one surface of the body of the mechanical connector, which extend in a direction toward the reciprocal surface of the mating element during engagement of the at least one surface of the mechanical connector with the reciprocal surface of the mating element, where the protruding elements is attached to the at least one surface at a first end of the protruding element and being free at the second end of the protruding element, and where the protruding element can separately flex along the length of the protruding element toward each of multiple directions including opposite directions. When the mechanical connector engages and slides relative to the mating element, the one or more protrusions are caused to flex in a direction that is substantially opposite a direction of the movement of the mechanical connector relative to the mating element along at least a portion of the predefined distance.

In at least one embodiment, when the at least one surface of the body of the mechanical connector engages the reciprocal surface of the mating element, the resulting spacing between the mechanical connector and the mating element within which the one or more protruding elements are located during movement across the predefined distance causes the relative movement between the mechanical connector and the mating element to resist changes in the direction.

The present application still further provides a two part connector, which includes a first connector part having a body having at least one engagement surface, and a second connector part having a body including at least one engagement surface, the second connector part being selectively coupled to the first connector part, where the engagement surface of the first connector is adapted to interact with the engagement surface of the second connector across a predefined distance when the first connector part is being coupled or decoupled relative to the second connector part. At least one of the first connector part and the second connector part includes one or more protruding elements, which are coupled at a first end of the protruding element to a respective one of the engagement surfaces of the first connector part and the second connector part, have a second end opposite the first end that extends toward the engagement surface of the first connector part and the second connector part that the corresponding first end of the protruding elements are not attached, and are adapted to flex along their length between the first end and the second end toward each of multiple directions including opposite directions. When the engagement surface of the first connector interacts with the engagement surface of the second connector, the one or more protrusions are caused to flex in a direction that is substantially opposite a direction of the movement of the first connector relative to the second connector along at least a portion of the predefined distance.

These and other features, and advantages of the present disclosure are evident from the following description of one or more preferred embodiments, with reference to the accompanying drawings.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification and is not intended to limit the invention to the specific embodiments illustrated. One skilled in the art will hopefully appreciate that the elements in the drawings are illustrated for simplicity and clarity and have not necessarily been drawn to scale. For example, the dimensions of some of the elements in the drawings may be exaggerated relative to other elements with the intent to help improve understanding of the aspects of the embodiments being illustrated and described.

Figure 1:
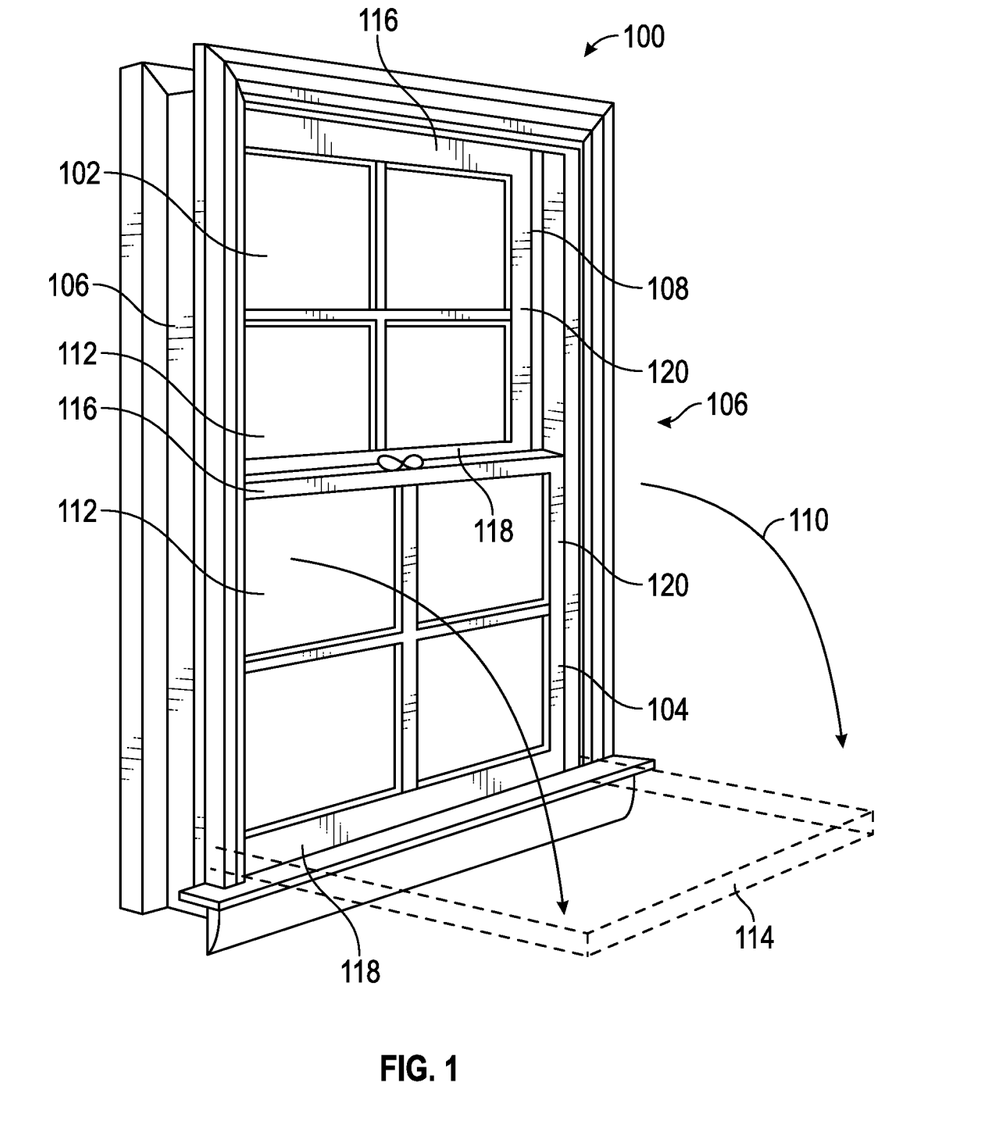
FIG. 1 is a perspective view of a tiltable sash window.

Referring now to the drawings in greater detail, there is illustrated in FIG. 1 a perspective view of a tiltable sash window assembly 100. The window assembly 100 has an upper outer (i.e. top) window sash 102 and a lower inner (i.e. bottom) window sash 104, which fit within two oppositely placed side jambs 106. Typically located within each of the two side jambs 106 is at least one jamb pocket 108, within which a sash balance shoe (not shown) can be located upon which the sash can move vertically within the window frame, and upon which the sash can tilt 110 between a vertical 112 and a horizontal 114 position. The window sashes 102 and 104 will often be coupled to a pair of sash balance shoes via a respective pivot bar proximate their lower corner, where the sashes are intended to slide vertically within the window frame. In at least some embodiments, the window sash balance shoe will be coupled to the frame via a tensioning device or spring, which can be located within respective jamb pockets 108, and provides a counter balance force for the weight of the window sash 102, 104, thereby making it easier for a sash to hold one of multiple different vertical positions within the window frame.

Figure 2:
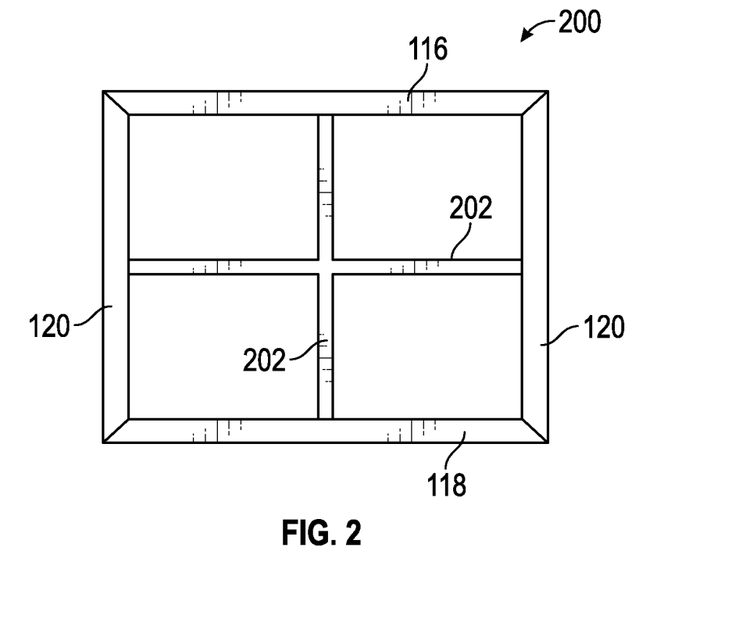
FIG. 2 is a front view of a window sash.

In the illustrated embodiment, each window sash includes a top rail 116, a bottom rail 118, and a pair of side stiles 120. This can also be seen in FIG. 2, which illustrates a front view of a window sash 200, which can correspond to either an upper window sash 102 or a lower window sash 104. The window sash can further include a muntin 202, which historically has been used to hold smaller panes of glass, together, within a larger window structure. More recently, muntins have been used with larger panes of glass to provide a more aesthetic architectural design detail. When used with a larger pane of glass, the muntin can sit on top of the pane, or where multiple panes of glass are present, between them.

Figure 3:
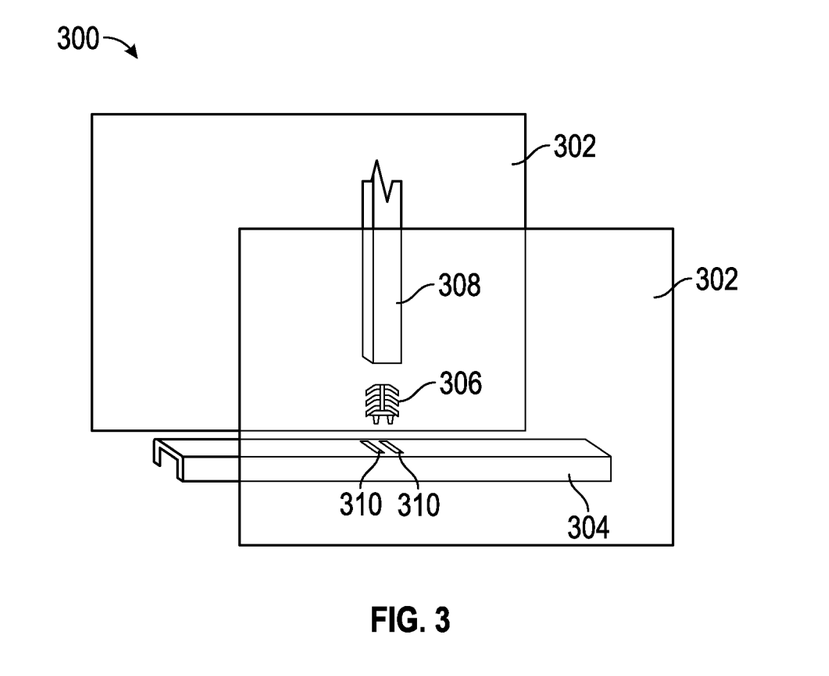
FIG. 3 is a partial exploded view of a portion of the internal structure of a multi-pane window sash including multiple glass panes, in accordance with at least some embodiments.

FIG. 3 illustrates a partial exploded view of a portion of the internal structure 300 of a multi-pane window sash including multiple glass panes, in accordance with at least some embodiments. The illustrated internal structure 300 includes multiple panes of glass 302, which come together, but generally do not touch creating a space therebetween. The panes of glass 302, in the illustrated example, are kept separate through the use of a spacer bar 304, which can extend around the perimeter of the panes of glass within the window sash 200. A muntin clip 306 can be attached to the spacer bar 304, where it is desirable for a muntin bar 308 to be held in place. In at least some instances, the muntin clip 306 will attach to the spacer bar 304 through one or more openings 310 through which protrusions in the base of the muntin clip 306 can attach.

Figure 4:
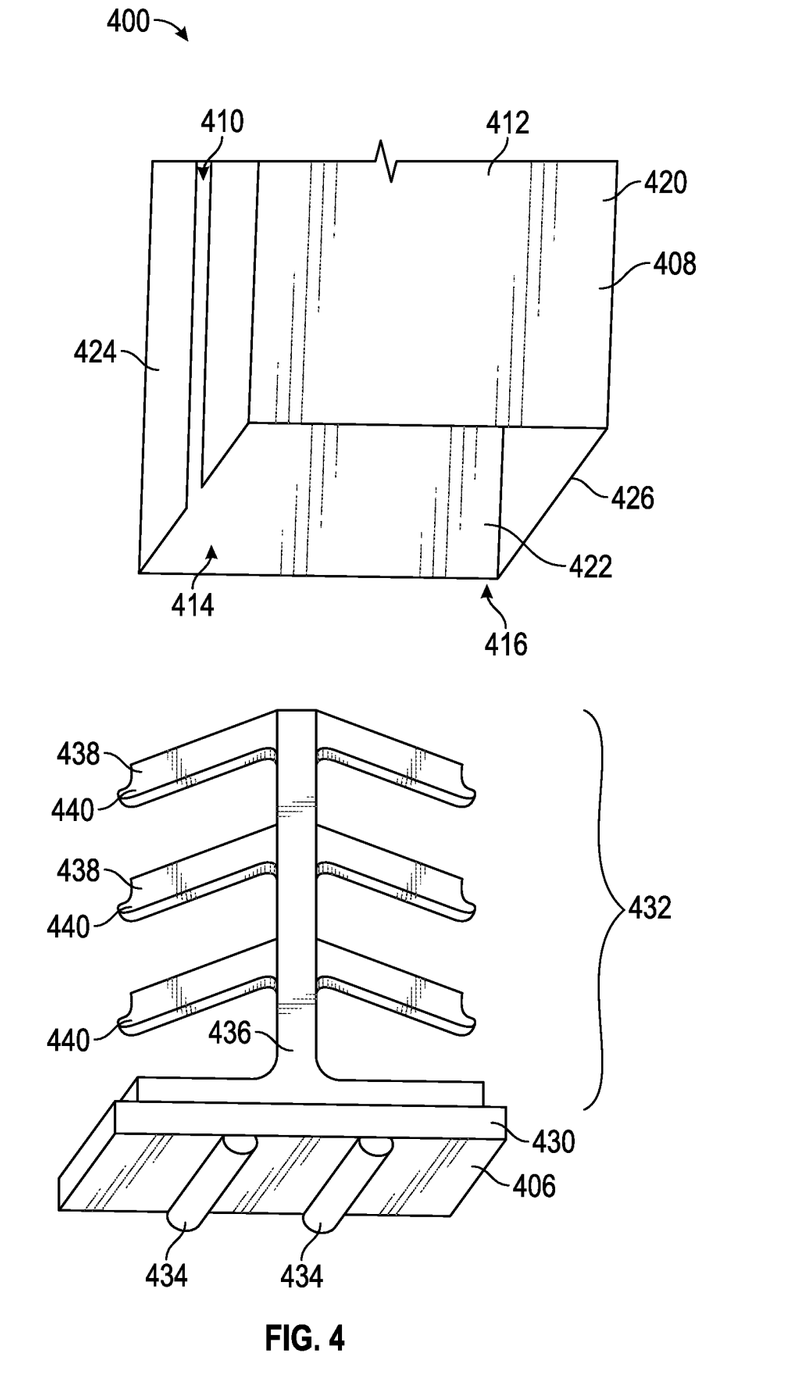
FIG. 4 is an enlarged partial view of an exemplary muntin clip and an end of a muntin bar.

FIG. 4 illustrates an enlarged partial view 400 of an exemplary muntin clip 406 and an end of a muntin bar 408. The muntin bar 408, in the illustrated embodiment, is formed from a foldable material, such as metal, that when folded will hold its form. More specifically, the material is folded forming one or more corners, such that the edges of the folded material meet at a seam 410 forming a tube having an encircling side wall 412 that encloses an interior space 414 having an opening 416 at opposite ends, one of which is shown. In the particular embodiment illustrated the material forming the tube includes four folds, which result in a rectangular cross section, where each fold defines a transition between adjacent sides. The tube includes a side wall having a front 420, a back 422 and two oppositely facing and spaced apart sides 424 and 426. The sides are each coupled between the front and the back, and one of the sides 424 includes the seam 410. While the illustrated embodiment shows a tube having four folds and a rectangular cross section, one skilled in the art will appreciate that the tube could have a different number of folds, as well as a different cross sectional shape without departing from the teachings of the present application. In fact, it is possible that the tube might not have any folds, which might correspond to a tube having a circular or oval cross sectional shape.

The end of the muntin bar 408, corresponding to the opening 416 is adapted to receive at least a portion of one end of a muntin clip 406. In the illustrated embodiment, the muntin clip 406 includes a base 430, and an engagement portion 432. In the illustrated embodiment, the base 430 facilitates coupling to the spacer bar 304 and includes protrusions 434. The protrusions 434 are adapted to attach to the spacer bar 304 through respective openings 310, in the same. In the illustrated embodiment, the engagement portion 432 includes a trunk 436, which extends from the base 430 in a direction that is intended to enter the interior space 414 of the muntin bar 408 through the opening 416. From the trunk 436, the engagement portion 432 includes multiple branches 438 that extend from the trunk 436, and are adapted to engage the side wall 412 of the muntin bar 408 from within the interior space 414 of the muntin bar 408, when the muntin clip 406 is inserted into the muntin bar 408.

At the end of each branch 438, the muntin clip 406 includes one or more protruding elements 440, which extend in a direction that includes a component that is perpendicular to the direction of insertion of the engagement portion 432 into the muntin bar 408. The protruding elements 440 are adapted to engage the side wall 412, as well as to separately flex in at least opposite directions. In addition to the protruding elements 440 being adapted to flex, when coming into contact with the side wall 412, the branches 438 are also adapted to flex, where the branches 438 without flexing are sized to extend a distance that is greater than the size of the interior space 414 will allow. In the illustrated embodiment, the branches 438 are oriented and arranged so as to be angled relative to the trunk 436, such that as it extends away from the trunk 436, the branches 438 are angled slightly so as to extend in a direction that is away from the anticipated direction of insertion, when the engagement portion 432 is coupled to the muntin bar 408.

The same interaction between the side wall 412 and the branches 438, that cause the branches to deflect is similarly responsible for causing the protruding elements 440, which are located at or near the end of the branches 438, to similarly deflect. In at least some instances, the protruding elements 440 are more flexible than the branches 438, as well as are less resistant to flexing. In at least some instances, the protruding elements 440 correspond to a blade coupled to the branch 438 at one of the side edges of the blade. In at least other instances, the protruding elements 440 correspond to a filament or hair like element that is coupled to the branch 438 at one end of the filament.

Figure 5:
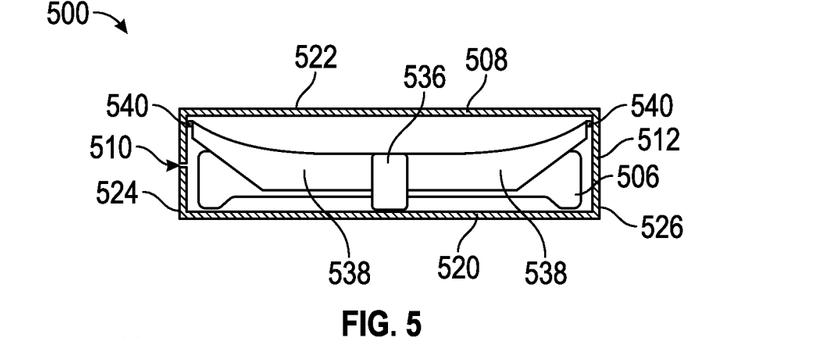
FIG. 5 is a cross sectional top view of a muntin clip that has been received within an end of a muntin bar.

FIG. 5 illustrates a cross sectional top view 500 of a muntin clip 506 that has been received within an end of a muntin bar 508. The muntin bar includes a side wall 512, which extends around to enclose an interior space 514, within which at least a portion of the muntin clip 506 can be received. The edges of the material, which form the side wall 512 meet to form a seam 510, that in the illustrated embodiment extends at least a significant portion of the length of the muntin bar 508 approximately midway along the width of one of the sides 524 and 526, which corresponds to the distance between the front 520 and the back 522 of the side wall 512.

The muntin clip 506 similarly includes multiple branches 538, which similarly extend from a trunk 536, which is adapted to extend into the muntin bar 508 through an opening at one of the ends. In addition to extending down from the trunk 536 in a direction that is away from an anticipated direction of insertion of the muntin clip 506 into the muntin bar 508, the branches 538 additionally extend from the trunk 536 while the muntin clip 506 is inserted into the muntin bar 508 from the front 520 of the side wall 512 of the muntin clip 506 toward the back 522 of the side wall 512 of the muntin clip 506, as the branches 538 extend toward a respective side 524 or 526 of the side wall 512. The sweeping back of the branches 538, allows for the branches 538 to avoid an area of interaction with the muntin bar 508 that would coincide with the location of the seam 510, and closer to a back corner where the respective side 524 or 526 meets the back 522 of the side wall 512. As such, the forces being exerted by the muntin clip 506 upon the muntin bar 508 resulting from the deflection of each of the branches of the muntin clip 506 tend to be more focused at or near a corresponding back corner of the side wall 512. In the illustrated embodiment, proximate the end of each of the branches 538 is a protruding elements 540, which similarly exert and react to nearby forces.

Figure 6:
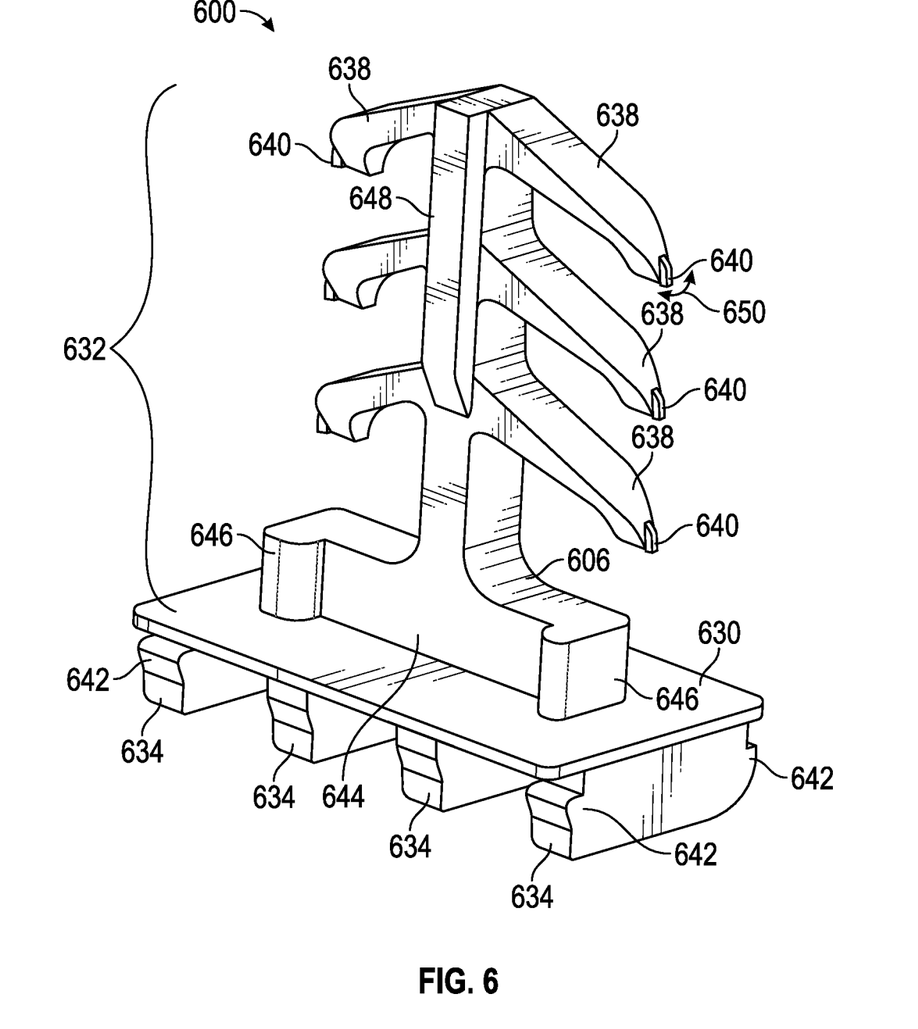
FIG. 6 is a perspective view of an exemplary muntin clip.

FIG. 6 illustrates a perspective view 600 of an exemplary muntin clip 606. In the illustrated embodiment, the base includes four protrusions 634 extending down from the base 630, which are intended to be used in coupling the muntin clip 606 to the window sash. In at least some instances, the clip can be formed from a material, such as some plastics, that can tolerate some deformation, where the material will temporarily compress and/or flex to allow an oversized portion of the protrusion 634 to be inserted through a slightly smaller opening 310, with the compressed material spreading back out after it has passed through the opening. More specifically, the outer two protrusions 634 have ears 642, that when they are press fit and pass through a slightly undersized opening can snap back to their uncompressed state, which will help serve to retain the clip, relative to the openings 310 through which they were press fit.

Furthermore, the illustrated embodiment has an engagement portion 632, that includes portions that are sized to better match the size and shape of the interior space of the muntin bar within which the muntin clip 606 is adapted to be received. For example, the bottom 644 of the trunk 636, where the trunk 636 meets the base 630 of the muntin clip 606 includes corresponding lobes 646 which are sized to correspond to the size of the opening of the muntin bar, so as to fit more snuggly within the same. This helps to limit the lateral side to side and front to back movement of the muntin clip 606 within the interior space of the muntin bar. In the illustrated embodiment, the trunk 636 further widens toward the top to provide a further surface 648 that is intended to more snuggly engage the front side wall of the muntin bar from the inside, when the muntin clip 606 is inserted into the same.

The branches 638 of the muntin clip 606 proximate their free end include protruding element 640. In the illustrated embodiment, the protruding elements 640 are in the shape of vertical mini-blades, which are adapted to more readily flex 650, selectively, side to side toward at least one of the front or the back of the side wall. As noted previously, the branches 638 can be shaped to avoid interaction with any seam in the side wall of a muntin bar, so as to avoid putting pressure on any present gap associated with the seam.

In the illustrated embodiment, the branches 638 including their protruding elements 640 are sized in an uncompressed state to extend beyond the available interior space of the muntin bar. As such, when the engagement portion 632 of the muntin clip 606 is received within the interior space of the muntin bar, a combination of the branches 638 and the protruding elements 640 deflect to more closely conform to the available interior space. The branches 638, to the extent that they may need to deflect to conform to the interior space, are arranged to vertically deflect downward toward the base 630, as well as horizontally toward the back corners of the muntin bar. The mini-blades being much more malleable can more readily flex conforming to the shape of the interior surface of the muntin bar corner, which in turn increase the pressure point friction fit. The size and shape of the branches 638 additionally help to keep the muntin clip 606 centered and stable relative to the interior space of the muntin bar to which it is intended to be attached.

Figure 7:
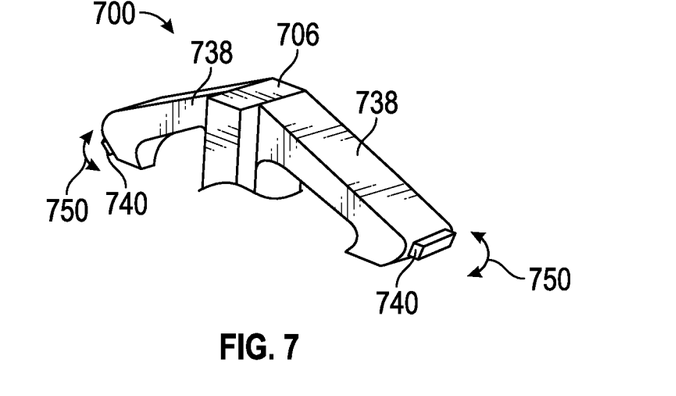
FIG. 7 is a partial perspective view of a further exemplary muntin clip.

FIG. 7 illustrates a partial perspective view 700 of a further exemplary muntin clip 706. In the illustrated embodiment, the protruding elements 740 at or near the end of branches 738 are horizontal mini-blade. The horizontal mini-blades are adapted to more readily flex 750, selectively, up and down. The up and down movement will relate to the direction of movement of the muntin clip 706 relative to the muntin bar during coupling and decoupling. The mini-blade will tend to initially flex in a direction that is opposite the relative movement of the clip 706. Furthermore, once deflected, the mini-blade will generally offer increased resistance to changes in direction of the relative movement. Any change of direction in the relative movement will generally be accompanied by an attempt by the mini-blade to change the direction of flexing. Because the change in direction of the flexing can involve a certain amount of increased space and/or increased compression of the material of the protruding elements 740, in order to accommodate the additional space requirements and/or increased compression, it may be possible for the branches 738 to additionally flex. However, the branches 738 are generally somewhat more resistant to further flexing. Alternatively, this will cause a need for the material of the protruding element 740 to change position through a somewhat confined space. In turn this will cause an increased resistance to changes in direction of the relative movement of the muntin clip 706 relative to the muntin bar, which once coupling has been initiated will more greatly resist any change in direction of relative movement needed for decoupling.

Figure 8:
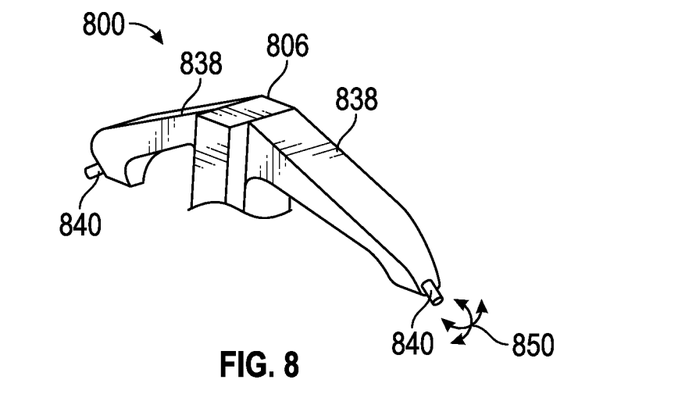
FIG. 8 is a partial perspective view of a still further exemplary muntin clip.

FIG. 8 illustrates a partial perspective view 800 of a still further exemplary muntin clip 806, where the protruding elements 840 are filament-like structures that can more readily flex 850 in multiple directions. The filament-like protruding element 840 is coupled at or near an end of a branch 838, which are both capable of some degree of flexing. The threadlike filament structure of the protruding element 840 is coupled to the branch at one of its ends. The other end is unattached, which allows it to move more freely, where along the length between the ends, the protruding element 840 is allowed to flex. The shape of the filament as opposed to a blade like structure is more conducive to flexing in any and all directions. Nevertheless, in a confined space, a change in direction of the flexing continues to require a bunching of material, that will generally increase the resistance to such a transition.

Figure 9A:
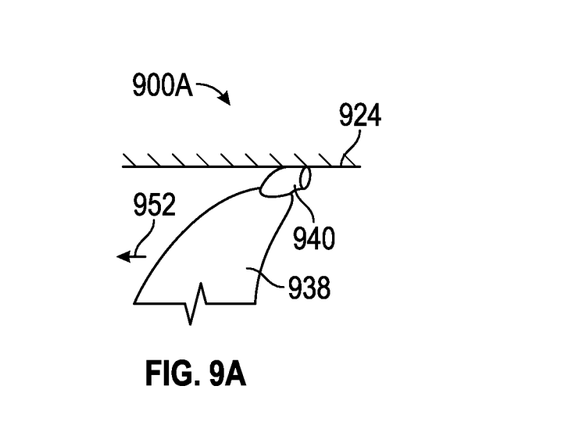
FIGS. 9A through 9C are exemplary sequential plan views illustrating an interaction of a protruding element with an engagement surface of a mating element as the relative movement of the mechanical connector and the mating element changes direction.
Figure 9B:
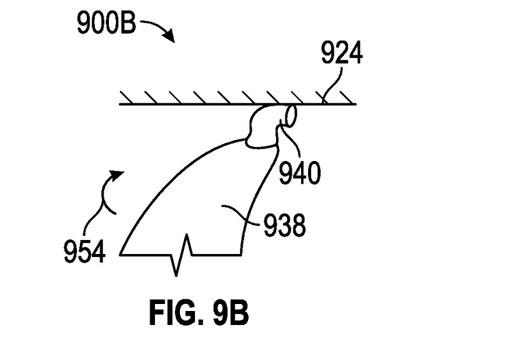
Figure 9C:
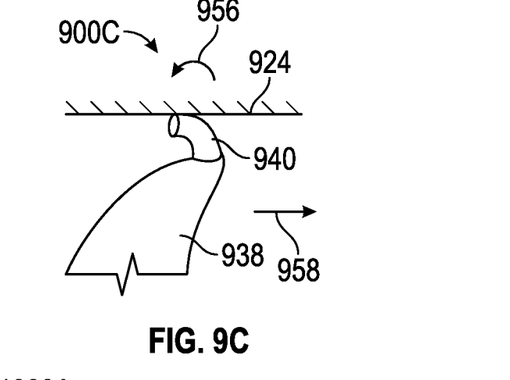

FIGS. 9A through 9C illustrate exemplary sequential plan views 900A, 900B and 900C, illustrating an interaction of a protruding element 940 with an engagement surface 924 of a mating element as the relative movement of the mechanical connector and the mating element changes direction. In the illustrated embodiment, the protruding element 940 is coupled to a branch 938 at one end, which allows the other end of the protruding element 940 to flex more freely. As noted previously, during an initial interaction between the protruding element 940 and the engagement surface 924, as illustrated in FIG. 9A, an initial relative movement 952 of the branch 938 and correspondingly the protruding element 940 causes the protruding element 940 to flex in a direction opposite the direction of movement of the branch 938.

As the branch 938 begins to change direction 954 relative to the engagement surface 924, the frictional interaction between the protruding element 940 and the engagement surface 924 causes the protruding element 940 to begin to flex in another direction. However, the relative proximity between the protruding element 940 and the engagement surface 924 does not readily allow for a smooth change in the direction of flexure. As illustrated, as part of the transition to a new direction of flexing, the protruding element 940 goes through a period of bunching and compression during which the relative friction between the protruding element 940 and the engagement surface 940 will likely increase. The increase in resistance during changes in direction of the relative movement between the branch 938 and the engagement surface 924 results in an added force that becomes necessary to cause the change to occur.

However once the increased resistance has been overcome, which generally coincides with a completion of a flipping 956 of the flexure of the protruding element 940, the frictional resistance associated with the new direction of relative movement 958 will return back closer to the frictional resistance associated with the initial movement 952.

In instances where the branch 938 is associated with a muntin clip, and the engagement surface 924 is associated with an interior surface of a muntin bar, changes in direction of relative movement between the muntin clip and the muntin bar will similarly result in an increase at least temporarily in the frictional resistance.

Figure 10A:
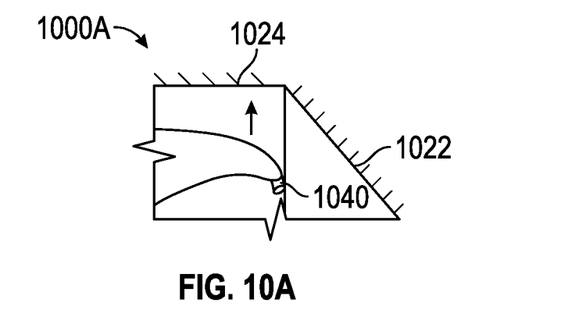
FIGS. 10A through 10B are multiple angle views including a partial perspective view and a partial top view of an interaction of a protruding element with a pair of engagement surfaces, which form a corner, as the protruding element moves relative to the engagement surfaces.
Figure 10B:
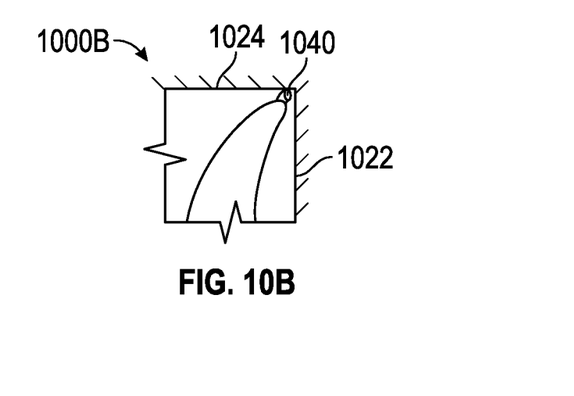

FIGS. 10A through 10B illustrate multiple angle views including a partial perspective view 1000A and a partial plan view 1000B of an interaction of a protruding element 1040 with a pair of engagement surfaces 1024 and 1022, which form a corner, as the protruding element 1040 moves relative to the engagement surfaces. Any transition associated with a relative change of direction is similar to the transition illustrated in FIGS. 9A through 9C. However, the space within which the protruding element 1040 can flip can sometimes be even more constrained. In such an instance, the pair of engagement surfaces 1024 and 1022 can form a groove along and within which the protrusion element can be located, which can sometimes limit the space through which the protruding element, and portions thereof, can compress and move during any attempted flipping. In turn, a protruding element in conjunction with at least some interactions with a pair of engagement surfaces, which form a corner have the potential to offer even greater resistance to changes in relative direction of movement between them.

While FIGS. 6 through 8 show multiple different examples of protruding elements for use with the branches of different muntin clips, it is possible that different types of protruding elements could be incorporated into the same muntin clip. In such an instance it may be possible for different branches to make use of different types of protruding elements, so as to mix and match the various beneficial effects that might be associated with each of the different types.

Figure 11:
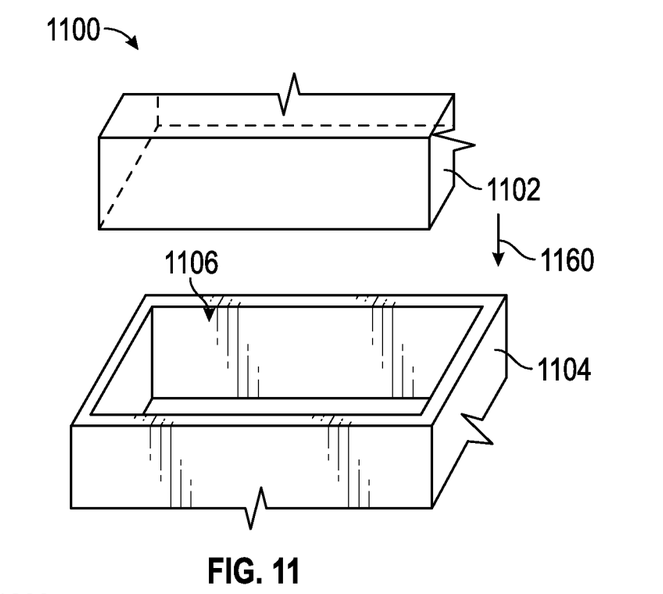
FIG. 11 is a partial perspective view of an exemplary two part connector, which have parts that are adapted to selectively couple and decouple.

FIG. 11 illustrates a partial perspective view 1100 of an exemplary two part connector, which have parts that are adapted to selectively couple and decouple. More specifically, the two part connector coincides with a box connector 1102, which is adapted to fit within a mating connector 1104 that has an interior space 1106 and opening, which conforms to the size and shape of the box connector 1102. The interior space 1106 is adapted to receive the box connector 1102. If the size and shape of the interior space 1106 is sufficiently close to the size and shape of the box connection (for example with the size and shape of the interior space 1106 generally being at least a little larger), then a frictional aspect associated with the coupling of the two is possible. One or more protruding elements could then be used with respect to one or both of the connector elements to affect the frictional interaction including an amount of friction that can potentially change as part of any relative change in the direction of the movement between the two connector elements during coupling and decoupling.

In at least some instances, the box connector can be considered a male connector, and the mating connector having an interior space for receiving at least a portion of the box connector can be considered a female connector. However, in some instances, the two connector parts can be used to facilitate an electrical connection, and in such an instance the nature of the structure that supports the electrical connection can impact the male/female classification.

Figure 12:
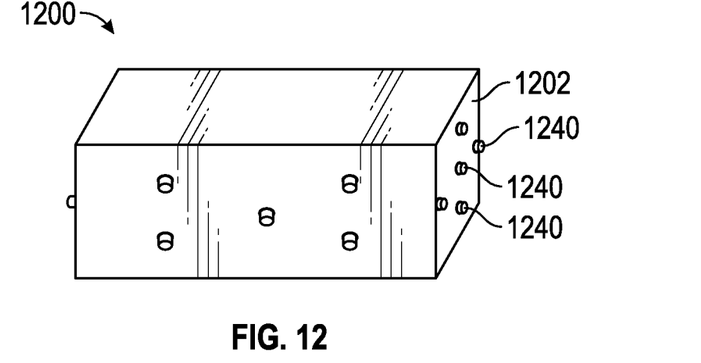
FIG. 12 is a perspective view of one part of the two part connector illustrated in FIG. 11 highlighting the presence of a plurality of protruding elements in an exemplary potential placement pattern.

FIG. 12 illustrates a perspective view 1200 of one part 1202 of the two part connector illustrated in FIG. 11 highlighting the presence of a plurality of protruding elements 1240 in an exemplary potential placement pattern. In at least some instances, the protruding elements 1240 are located on the face of one of the sides that is intended to interact with an engagement surface of a mating connector. In other instances the protruding elements 1240 are located at a corner, or junction of two adjacent sides.

Figure 13:
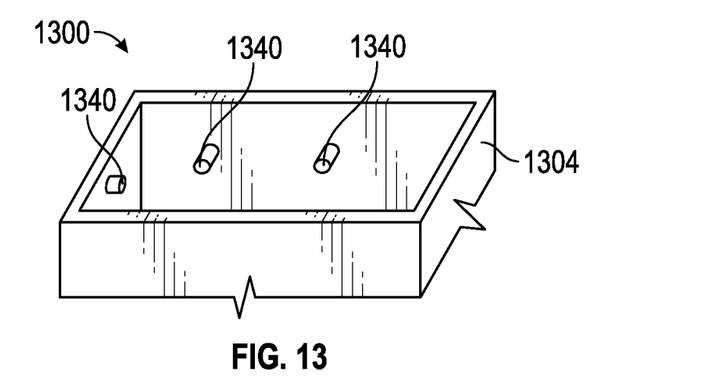
FIG. 13 is a partial perspective view of another part of the two part connectors illustrated in FIG. 11 highlighting the presence of a plurality of protruding elements in an exemplary potential placement pattern.

FIG. 13 illustrates a partial perspective view 1300 of another part 1304 of the two part connectors illustrated in FIG. 11 highlighting the presence of a plurality of protruding elements 1340 in an exemplary potential placement pattern. In the illustrated embodiment, the protruding element 1340 can be present on one or more faces of the sides of the internal space, that are intended to come into contact with a corresponding surface of the mating part. In some instances, where both of the connector elements include respective protruding elements, the protruding elements 1240 of one of the connector elements 1202 will be placed so as to not interfere with a protruding element 1340 of the other connector element 1304.

Further, while the two part connector and portions thereof, illustrated in FIGS. 11 through 13, highlight a structure that has at least four surfaces that interact during coupling and decoupling, the beneficial aspects of protruding elements only need a single set of engagement surfaces upon which the protruding elements could be used to produce the beneficial effects. In such an instance, other structural features could be used to insure that the two respective engagement surfaces, which include a surface that incorporates protruding elements, are brought together in a manner so as to resist changes in direction, which might necessitate an additional force being at least initially required to start a decoupling after the two connector elements have been initially brought together 1160.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A muntin clip adapted for coupling a muntin bar to a window sash, the muntin bar being a tubular member with one or more open ends and a sidewall extending around the open end, the sidewall of the tubular member having a front and a back and two oppositely facing and spaced apart sides coupled between the front and the back, the muntin clip comprising:

a base adapted for attaching to the window sash;

a body, which extends from the base, and is adapted in a direction of insertion to extend into one of the open ends of the tubular member of the muntin bar for coupling thereto;

one or more protruding elements, where each of the one or more protruding elements are coupled to the body at a respective point of coupling, where each of the one or more protruding elements extends from the respective point of coupling in a direction of extension that includes a component that is perpendicular to the direction of insertion of the body into the tubular member, and where a same one of each of the one or more protruding elements is adapted for separately flexing at different times, so as to alternatively extend from the respective point of coupling in at least opposite directions; and wherein at least some of the one or more protruding elements are coupled to the body of the muntin clip via a respective one of one or more branches, the one or more branches being distinct from the one or more protruding elements, where each one of the one or more branches extends from the body at a point of coupling in a direction that includes a component that is perpendicular to the direction of insertion of the body into the tubular member, and each one of the one or more branches extends from the body at the point of coupling to the body in a direction that includes a component that is opposite the direction of insertion of the body as the body extends into the tubular member; and wherein when the muntin clip moves in a direction relative to the tubular member, including the muntin clip alternatively being inserted and extracted relative to the tubular member, the one or more protruding elements of the muntin clip engage the sidewall of the tubular member and have an amount of flexibility where each of the one or more protruding elements is caused to flex, so that the direction of extension further includes an additional component that extends in a direction that is substantially opposite the direction of the movement of the muntin clip relative to the tubular member including changing the direction of extension of the protruding elements from the respective points of coupling as part of a change of the direction of movement between the direction of insertion and a direction of extraction of the muntin clip relative to the tubular member, while the muntin clip is at least partially inserted within the tubular member and the one or more protruding elements engage the sidewall of the tubular member, and the one or more branches have an amount of rigidity, where the branches are more resistant to flexing than the one or more protruding elements, such that when the muntin clip moves in the direction relative to the tubular member and transitions between the direction of insertion and the direction of extraction, the direction of extension of the branches maintain a component that is opposite the direction of insertion.

2. A muntin clip in accordance with claim 1, wherein, when the muntin clip is inserted into the tubular member, the branch extends from the body in a direction toward a respective one of the sides of the sidewall, and the branch is biased in an angled fashion toward one of the front or the back of the sidewall away from a center of the respective side of the sidewall.

3. A muntin clip in accordance with claim 2, wherein the direction of extension of the branch being biased in an angled fashion toward one of the front or the back of the sidewall away from the center of the respective side includes a bias toward a corner of the tubular member formed from the front or the back of the sidewall joining the respective side of the sidewall.

4. A muntin clip in accordance with claim 1, wherein the protruding member is a blade having an attachment edge, which is coupled to the body, and a free edge, where the free edge is adapted to flex in one of two opposing directions.

5. A muntin clip in accordance with claim 1, wherein the protruding member is a filament having an attachment end, which is coupled to the body, and a free end, where the free end is adapted to flex in one of multiple directions, at least some of which are opposing directions.

6. A muntin clip in accordance with claim 1, wherein during the change in the direction of the extension of the protruding element, the interaction between the protruding element and the sidewall of the tubular member includes an increase in the friction between the protruding element and the sidewall of the tubular member.

7. A muntin clip in accordance with claim 1, wherein the amount of rigidity of the branch and corresponding increased resistance to flexing causes any associated protruding element coupled to an end of the branch to be pressed against the sidewall of the tubular member by the branch, while the muntin clip is at least partially inserted into the tubular member and the one or more protruding elements engage the sidewall of the tubular member.

* * * * *